United States Patent
Shen et al.

(10) Patent No.: US 7,459,413 B2
(45) Date of Patent: Dec. 2, 2008

(54) CATALYST COMPOSITION FOR TREATING HEAVY FEEDSTOCKS

(75) Inventors: Baojian Shen, Changping (CN); Jinsen Gao, Changping (CN); Chunming Xu, Changping (CN); Liang Zhao, Changping (CN); Xianfeng Li, Changping (CN); Pei Wu, Changping (CN)

(73) Assignee: State Key Laboratory of Heavy Oil Processing, Changping (CN)

( * ) Notice: Subject to any disclaimer, the term of this patent is extended or adjusted under 35 U.S.C. 154(b) by 0 days.

(21) Appl. No.: 11/709,115

(22) Filed: Feb. 21, 2007

(65) Prior Publication Data

US 2007/0209969 A1    Sep. 13, 2007

(30) Foreign Application Priority Data

Mar. 10, 2006   (CA) .................................. 2539231

(51) Int. Cl.
 *B01J 29/06*   (2006.01)
(52) U.S. Cl. .............................. 502/64; 502/63; 502/65; 502/66; 502/67; 502/68; 502/69; 502/70; 502/71
(58) Field of Classification Search ............... 502/63, 502/64, 65, 66, 67, 68, 69, 70, 71
See application file for complete search history.

(56) References Cited

U.S. PATENT DOCUMENTS

| | | | | |
|---|---|---|---|---|
| 4,315,814 A | * | 2/1982 | Shihabi | 208/111.15 |
| 4,578,371 A | * | 3/1986 | Rieck et al. | 502/71 |
| 5,057,296 A | * | 10/1991 | Beck | 423/277 |
| 5,951,963 A | * | 9/1999 | He et al. | 423/713 |
| 2001/0051754 A1 | * | 12/2001 | Lissy et al. | 585/319 |
| 2003/0027713 A1 | * | 2/2003 | O'Connor et al. | 502/64 |

FOREIGN PATENT DOCUMENTS

EP   0 925 831 A3   12/1999

OTHER PUBLICATIONS

Ogura, et al., Alkali-treatment technique-new method for modification . . . , Elsevier Science B.V., 2001, pp. 33-43, Dept of Applied Chem. Waseda Univ., Tokyo, Japan.
Tetsuo Suzuki & Toshio Okuhara, Chang in pore structure of MFI zeolite . . . , Elsevier Science B.V., 2001, pp. 83-89, Grad School of Environmental Earth Science, Hokkaido Univ.
Groen, et al., Mesoporosity development in ZSM-5 zeolite upon . . . , Elsevier Science B.V., 2004, pp. 55-58, Faculty of Applied Sciences, Delft Univ, Julianalaan, the Netherlands.
Dianzhong, et al., Preparation and Characterization of MMM Zeolite, Chinese Journal of Catalysts, Mar. 2003, vol. 24, No. 3, pp. 208-212.

* cited by examiner

*Primary Examiner*—Elizabeth D Wood
(74) *Attorney, Agent, or Firm*—Kenneth H. Johnson (57) ABSTRACT

The present invention provides a catalyst and a process for its preparation and its use in cracking heavy feedstocks. The catalyst comprises one or more zeolites having a controlled silica to alumina ratio and preferably treated with alkali in the presence of a matrix component selected from the group consisting of clays, synthetic matrix other than pillared clay, and mixtures thereof. The catalyst are particularly useful in treating heavy feedstock such as residues from oil sands processing.

14 Claims, 3 Drawing Sheets

Fig.3 BJH adsorption pore size distribution of AT-Shape-Zeolites

CATALYST COMPOSITION FOR TREATING HEAVY FEEDSTOCKS

FIELD OF THE INVENTION

The present invention relates to the cracking of heavy feedstocks such as vacuum gas oils and heavy oils derived from feedstocks such as tar sands and shale oils. More particularly the present invention relates to the fluid bed catalytic cracking (FCC) or moving bed catalytic cracking of heavy feedstocks to produce a high amount of lower olefins and particularly alpha olefins with gasoline and diesel cuts as co-products and a reduced amount of coking.

BACKGROUND OF THE INVENTION

Zeolites have been available for many years. Zeolites are alumina silicate complexes formed of layers of ring structures. The resulting structure has a controlled pore size which may include or exclude molecules of different sizes. Different zeolites having different ratios of aluminum to silica have a different unit structure on a molecular level and tend to have a different pore size.

U.S. Pat. No. 6,858,556 published Feb. 22, 2005 in the name of Kuvettu, et al., assigned to the Indian Oil Corporation Limited, discloses a process for cracking heavier feedstocks in the presence of a stabilized dual zeolite catalyst having a particle size in the range of 30-100 microns to produce a gasoline fraction and a liquefied petroleum gas (LPG) fraction typically lower alkanes (e.g. ethane, propane and butane). The patent does not suggest using a high pore volume component in the zeolite nor does the patent teach producing olefins.

EP application 0 925 831 published Jun. 30, 1999 to Guan et al., assigned to China Petrochemical Corporation and Research Institute of Petroleum Processing, Sinopec teaches a method for cracking heavy oil. The oil is cracked in a fluid bed cracker in the presence of a catalyst comprising one or more zeolites and a pillared clay. The present invention has eliminated the essential feature of a pillared clay from the '831 art. The zeolites are conventional zeolites and have not been treated with alkali. The '831 application does not disclose or suggest the subject matter of the present invention.

U.S. Pat. No. 3,894,934 issued Jul. 15, 1975 to Owen et al., assigned to Mobil oil Corporation teaches cracking a hydrocarbon feed in the presence of a small pore zeolite and a large pore zeolite in a weight ratio of 1:10 to 3:1. The small pore zeolite has a pore size not exceeding 9 angstroms (0.9 nanometers) and the large pore size zeolite has a pore size greater than about 9 angstroms (0.9 nanometers) (Col. 3 lines 30-35). The feed has an initial boiling temperature from 400° F. to 1100° F. (204° C. to 594° C.) to produce a gasoline cut and a lower paraffin or olefin stream which can be used to enhance the octane number of the resulting gasoline stream. The subject matter of the '934 patent teaches away from the subject matter of the present invention.

Ogura et al. (Masaru Ogura, Shin-ya Shinomiya, Junko Tateno, Yasuto Nara, Mikihiro Nomura, Eiichi Kikuchi, Masahiko Matsukata, Applied Catalysis A: General, 2001, 219, 33-43) found that a morphological change of ZSM-5 particles by the alkali-treatment could be observed and many cracks and faults were formed on the outer surface of zeolite grains or particles. Mesopores having a uniform size were formed in the zeolite particles, although the microporous structure remained under the conditions used in their work. In addition, they also found that the catalytic activity for cumene cracking was enhanced by the treatment. Their result indicated that alkali-treatment led to an increase in the number of adsorption sites and also in the diffusivity of benzene through zeolite micropores. The enhancement in catalytic performance can be explained due to the fact that the adsorptive-diffusive property of ZSM-5 is improved by alkali-treatment.

Suzuki et al. (Tetsuo Suzuki, Toshio Okuhara, Microporous and Mesoporous Materials, 2001,43, 83-89) declared that the NaOH-treatment of MFI zeolite brought about the increases in total surface area and external surface area. The increase in the surface areas was due to the formation of the supermicropores having about 1.8 nm in diameter, while the ultramicropores remained almost unchanged in the size and the volume. The supermicropores would be formed by the dissolution of tallites of MFI. The rate-determining step of dissolution of MFI zeolite would be the diffusion process of NaOH aqueous solution into the newly formed supermicropores.

Groen et al. (J. C. Groen, L. A. A. Peffer, J. A. Moulijn, J.Pérez-Ramirez, Colloids and Surfaces A: Physicochem. Eng. Aspects, 2004, 241, 53-58) studies are focused on the evolution and optimization of the porous structure by varying treatment time and temperature, using $N_2$- and Ar-adsorption. $N_2$-adsorption experiments have shown that optimization of the alkaline treatment of ZSM-5 zeolite leads to a combined porous material with an increased mesoporosity and preserved microporosity. An optimal treatment of commercial ZSM-5 ($SiO_2/Al_2O_3=37$) in 0.2M NaOH at 338 K for 30 min results in a spectacular increase of mesopore surface area from 40 to 225 $m^2/g$ (~450%) and a relatively small decrease in microporosity (25%). The mesopore formation is a result of preferential dissolution of Si from the zeolite framework. Variation of treatment time and temperature enables a certain tuning of the mesopore-size and volume. XRD (X ray diffraction) analysis evidences the long-range ordering to remain intact, while low-pressure Ar-adsorption confirms the preserved microporosity in the optimal alkaline-treated zeolite. Controlled desilication in ZSM-5 by an optimal alkaline treatment opens new approaches in the development of combined micro- and mesoporosity in catalyst design.

It is known, ZSM-5 having a lower framework (structure) silica to alumina (e.g. $SiO_2/Al_2O_3$) ratio can be obtained from the alkali treatment of ZSM-5. To synthesize a zeolite having an ultra-low framework Si/Al ratio is not easy. It will require a longer time, higher temperature with lower crystallinity and yields. During the desilication process, the lower $SiO_2/Al_2O_3$ ratio can be obtained through extracting siliceous species from the framework of ZSM-5. These results have also been reported by Ogura et al. (Masaru Ogura, Shin-ya Shinomiya, Junko Tateno, Yasuto Nara, Mikihiro Nomura, Eiichi Kikuchi, Masahiko Matsukata, Applied Catalysis A: General, 2001, 219, 33-43) and Wang D Zh et al. (Wang D Zh, Shu Xingtian, He Mingyuan, Chinese Journal of Catalysis, 2003, 24(3), 208-212.).

The present invention seeks to provide a catalyst based on mixed and modified zeolites, preferably alkali modified to reduce the Si/Al ratio and increase the pore size/volume (meso-large pore BET surface area (defined as the total BET surface area minus the micro-pore BET surface area) of greater than 50 $m^2/g$) suitable for cracking a heavy oil feed to produce a high amount of lower ($C_{2-4}$) olefins, and a gasoline and diesel cut which catalyst has a lower propensity for coking.

SUMMARY OF THE INVENTION

The present invention provides a process for preparing a modified zeolite catalyst comprising forming a slurry of with from 15 to 55 weight % of a matrix component selected from the group consisting of clays, synthetic matrix other than pillared clay and mixtures thereof and from 10 to 20 weight % of a sol or gel of a binder selected from the group consisting of oxides of aluminum, silicon, and mixtures thereof and from 0 to 15 weight % of an oxide of a group IVB or VB metal adding thereto from 10 to 75 weight % of a mixture of one or more zeolites selected from the group consisting of:

(i) an alkaline treated shape selective zeolite having a structure in which the silica to alumina ratio is less than 45 and a meso-large pore BET surface area of greater than 50 m$^2$/g;

(ii) an olefin selective zeolite having a structure in which the silica to alumina ratio is less than 70;

(iii) a beta zeolite having a structure in which the silica to alumina ratio is less than 100;

(iv) a Y-faujasite type zeolite having a structure in which silica to alumina ratio is less than 30;

wherein one or more of said zeolite components have been subjected to one or more of the following treatments, (a) impregnating said zeolite with a phosphorus compound to provide from 0.2 to 15 weight % calculated as P$_2$O$_5$ based on the weight of the zeolite and either currently or subsequently treating the impregnated zeolite with steam or water at a temperature from 110° C. to 800° C. at a pressure from 103.3 kPa to 6.89×10$^3$ kPa for a time from 0.1 to 20 hours;

(b) treating said zeolite with one or more group IVB, VB, VI B and VIII metal compounds to provide from 0.1 to 10 weight % of the metal based on the weight of the zeolite;

(c) treating said zeolite with one or more rare earth compounds to provide from 0.1 to 10 weight % of the oxide of the rare earth metal based on the weight of the zeolite;

forming particulates of said catalyst having a size from 0.001 to 0.8 (preferably 0.001 to 0.015 mm) mm.

The particulates may be formed by a process selected from the group consisting of:

(A) spray drying said slurry at a temperature from 100° C. to 650° C. and calcining the resulting solid at a temperature from 500° C. to 800° C.;

(B) drying the resulting slurry at a temperature from 100° C. to 150° C. and comminuting the resulting material (e.g. grinding, crushing, milling, etc.) and calcining the resulting solid at a temperature from 500° C. to 800° C.;

(C) extruding the resulting slurry as a particle and drying the particle at a temperature from 100° C. to 150° C. and calcining the resulting solid at a temperature from 500° C. to 800° C.

Optionally, in a further embodiment the dried catalyst may be further treated with from 0 to 15 weight % of a phosphorus compound calculated as P$_2$O$_5$ based on the weight of the catalyst.

In a further embodiment the present provides a catalyst suitable for cracking a hydrocarbon feedstock having a boiling point above 300° C. at a temperature from 500° C. to 800° C. and a pressure from 103.3 kPa to 6.89×10$^3$ kPa to produce more than 15% of C$_{2-4}$ olefins, and gasoline and diesel cuts as co-products, having a coke make of less than 18% prepared as described above.

In a further embodiment the present invention provides a process for the catalytic or catalytic plus pyrolysis cracking of a hydrocarbon feedstock having a boiling point above 300° C. at a temperature from 500° C. to 800° C. and a pressure from 103.3 kPa to 6.89×10$^3$ kPa to produce more than 15% of C$_{2-4}$ olefins, and gasoline and diesel cuts as co-products, and having a coke make of less than 18% in the presence of a catalyst as described above.

DETAILED DESCRIPTION

As used in this specification meso-large pore BET surface area means the total surface area of the zeolite (catalyst) minus the micro-pore surface area (e.g. the surface area of pores having a diameter less than about 0.9 nanometers). This may be determined by methods known in the art such as N$_2$ adsorption at low temperature.

The catalysts of the present invention comprise from 10 to 75 weight % of a mixture of one or more zeolites selected from the group consisting of:

(i) an alkaline treated shape selective zeolite having a structure in which the silica to alumina ratio is less than 45 and a meso-large pore BET surface area of greater than 50 m$^2$/g;

(ii) an olefin selective zeolite having a structure in which the silica to alumina ratio is less than 70;

(iii) a beta zeolite having a structure in which the silica to alumina ratio is less than 100; and (iv) a Y-faujasite type zeolite having a structure in which silica to alumina ratio is less than 30.

In the present invention, a zeolite which may be treated with alkali (e.g. typically a shape selective zeolite for olefins) for example, the commercially available NaZSM-5 (it has a framework or structure having a silica to alumina ratio from 25 to 200, preferably from 35 to 100 was treated with a weak, typically less than 0.5 M alkaline solution at 20° C. to 350° C., preferably at 50° C. to 200° C., after this treatment, usual workup (such as washing, drying, etc) was done, and it afforded the sodium form of AT Zeolite having a silica to alumina ratio less than 45, in the preferred case it is less than 40, in the more preferred case it is less than 35. The resulting alkaline treated sodium form zeolite may be, preferably is, ion exchanged into the proton form of zeolite, or it may be directly ion exchanged to rare earth or other metal ion form of zeolite.

While any of the zeolites used in the catalyst of the present invention may be alkali treated typically the zeolites which may be alkali treated include MFI-type zeolites, MEL-type zeolites such as ZSM-11, ZSM12, MTW-type zeolites such as ZSM-12, MWW-type zeolites such as MCM-22, and BEA-type zeolites such as zeolite beta. MFI-type zeolites are preferred. Typically the zeolites which may be treated with alkali have a silica/alumina ratio above 10 (or Si/Al ratio above 5), preferably above 30, and up to 12 rings in a structural unit. Generally these zeolites are olefin selective zeolites.

MFI-type zeolites are as defined in the ATLAS OF ZEOLITE STRUCTURE TYPES, W. M. Meier and D. H. Olson, 3rd revised edition (1992), Butterworth-Heinemann, and include ZSM-5, ST-5, ZSM-8, ZSM-11, silicalite, LZ-105, LZ-222, LZ-223, LZ-241, LZ-269, L2-242, AMS-1B, AZ-1, BOR-C, Boralite, Encilite, FZ-1, NU-4, NU-5, T5-1, TSZ, TSZ-III, TZ01, TZ, USC-4, USI-108, ZBH, ZB-11, ZBM-30, ZKQ-1B, ZMQ-TB.

Preferably, the zeolite which is alkali treated is selected from the group consisting of ZSM-5, ZSM-8, ZSM-11, ZSM-12, ZSM-35, ZSM-38, and combination thereof. Most preferably, the zeolite which is alkali treated is ZSM-5 in this invention.

After treatment with the alkali the zeolite should have a meso-large pore BET surface area of greater than 50 m$^2$/g, preferably greater than 80 m$^2$/g. The ratio of silica to alumina in the zeolite should be less than 45 preferably less than 40, most preferably less than 35.

The second zeolite which may be used in the present invention is an olefin selective zeolite having a structure in which the silica to alumina ratio is less than 70, preferably less than 40. These types of zeolites are the same as the above groups of zeolites except they have not been treated with alkali. Preferably the zeolites used as component (ii) will have a meso-large pore BET surface area less than 40 m$^2$/g, preferably less than 30 m$^2$/g.

The third zeolite component which may be used in the present invention may be a beta zeolite having a structure in which the silica to alumina ratio is less than 100.

The fourth zeolite component may be a Y-faujasite type zeolite having a structure in which silica to alumina ratio is less than 30.

The above zeolites may undergo further treatment (it is noted that the first component is alkali treated but the other components may also be alkali treated). The treatment may be, in any order, selected from the group of treatments consisting of:

(a) impregnating the zeolite with a phosphorus compound to provide from 0.2 to 15, typically from 3 to 12, weight % calculated as P$_2$O$_5$ based on the weight of the zeolite and either concurrently or subsequently treating the impregnated zeolite with steam and/or water at a temperature from 110° C. to 800° C. at a pressure from 103.3 kPa to 6.89×10$^3$ kPa for a time from 0.1 to 20 hours;

(b) treating the zeolite with one or more group IVB, VB, VIB and VIII metal compounds to provide from 0.1 to 10 weight % of the metal based on the weight of the zeolite; and (c) treating the zeolite with one or more rare earth compounds to provide from 0.1 to 10 weight % of the oxide of the rare earth metal based on the weight of the zeolite.

The impregnation of zeolites with phosphorus compounds and a calcination treatment is known to improve olefin selectivity. The phosphorus compounds may be selected from the group consisting of any phosphorus-containing compound having a covalent or ionic constituent capable of reacting with hydrogen ions. Some useful phosphorus compounds include, for example phosphoric acid and its salts such as ammonium dihydrogen phosphate and diammonium hydrogen phosphate, ammonium hypophosphate, ammonium orthophosphate, ammonium dihydrogen orthophosphate, ammonium hydrogen orthophosphate, triammonium phosphate, phosphines, and phosphites. Suitable phosphorus-containing compounds also include derivatives of groups represented by PX$_3$, RPX$_2$, R$_2$PX, RPO$_2$, RPO(OX)$_2$, PO(OX)$_3$, R2P(O)OX, RP(OX)$_2$, ROP(OX)$_2$, and (RO)$_2$POP(OR)$_2$, wherein R is an alkyl radical, preferably C$_{1-6}$, most preferably C$_{1-4}$ alkyl radical or phenyl radical which is unsubstituted or may be substituted with up to three C$_{1-6}$, preferably C$_{1-4}$ alkyl radicals and X is hydrogen atom, R (as defined above) or a halogen atom, preferably chloride or fluoride. These compounds include primary, RPH$_2$, secondary, R$_2$PH, and tertiary, R$_3$P, phosphines such as butyl phosphine; tertiary phosphine oxides, R$_3$PO, such as tributyl phosphine; primary, RP(O)(OX)$_2$, and secondary, R$_2$P(O)OX, phosphonic acids such as benzene phosphonic acid; esters of the phosphonic acids such as diethyl phosphonate, (RO)$_2$P(O)H, dialkyl phosphinates, (RO)P(O)R$_2$; phosphinous acids, R$_2$POX, such as diethylphosphinous acid, primary, (RO)P(OX)$_2$, secondary, (RO)$_2$POX, and tertiary, (RO)$_3$P, phosphites; and esters thereof such as monopropyl ester, alkyldialkyl phosphinites, (RO)P$_2$, and dialkyl phosphonite, (RO)$_2$PR esters. Examples of phosphite esters include trimethyl phosphite, triethyl phosphite, diisopropyl phosphite, butyl phosphite; and pyrophosphites such as tetrapyrophosphate. The alkyl groups in the mentioned compounds contain 1 to 4 carbon atoms. Other suitable phosphorus-containing compounds include phosphorus halides such as phosphorus trichloride, bromide, and iodide, alkyl phosphorodichloridites, (e.g. (RO)PCl$_2$), dialkyl phosphorochloridites, (e.g. (RO)$_2$PCl), alkyl phosphonochloridates, (e.g. (RO)(R)P(O)Cl), and dialkyl phosphinochloridates, (e.g. R$_2$P(O)Cl). Preferably, said phosphorus source is selected from the group consisting of ammonium dihydrogen phosphate and diammonium hydrogen phosphate, ammonium hypophosphate, ammonium orthophosphate, ammonium dihydrogen orthophosphate, ammonium hydrogen orthophosphate, triammonium phosphate, phosphine halides and organic phosphates, phosphines, and phosphates, and combinations thereof.

The amount of phosphorus may be from 0.2 to 15, preferably from 3 to 15, most preferably from 3 to 12 weight % based on the weight of the zeolite in the catalyst with the phosphorus loading calculated as P$_2$O$_5$. The extra phosphorus loading (e.g. here it means loading another or second amount of phosphorus after the catalyst has been shaped) may be in the range of 0.2 to 15 weight % based on the total weight of the catalyst.

In the present invention in-situ phosphorus steam (or steam and water) treatment procedure is provided. The said phosphorus-steam (or steam and water) treating step comprises loading the total amount of phosphorus by separated parts/steps and in each part/step followed or joined together with a steaming process (the steam treatment may be after the zeolite is otherwise treated (e.g. metal exchange, metal impregnation, etc.) or after the total catalyst is formed); or loading the total amount of phosphorus by continuously exposing the zeolite(s) with a mixture of steam (or steam-water blending) with and phosphorus source, under the conditions of pressure in the range of about atmospheric (15 psi or 103.4 kPa) to about 1000 pounds per square inch (6.89×10$^3$ kPa) absolute, temperature in the range of about 110° C. to about 800° C., preferably 200° C. to 750° C., most preferably 250° C. to 700° C. and time period in the range of about 0.1 hour to about 20 hours.

The zeolite may be treated (impregnated or ion exchanged) with one metal element selected from the group consisting of Group VB, VIB, VIIB and VIII elements of the periodic table to form a metal treated, or exchanged zeolite. The metal element may be selected from the group consisting of the nitrate, sulfate, sulfide, chloride, bromide, fluoride, acetate, carbonate, perchlorate, phosphate of V, Cr, Mn, Fe, Co, Ni and Cu and combinations thereof. The amount of metal, in the form of metal oxide, is to provide a concentration in said zeolites in the range of from about 0.1 to about 15, preferably less than 12, typically less than 10 weight percent of the weight of the zeolite. This corresponds to about 0.1 to 8 weight % based on the total weight of the catalyst.

The zeolites of the present invention may also be treated (impregnated or ion exchanged) with one or more rare earth compounds to provide from 0.1 to 10 weight % of the oxide of the rare earth metal based on the weight of the zeolite. This corresponds to about 0.1 to 7 weight % based on the weight of the total catalyst.

The zeolite components, whether treated or not may be combined and used in the catalyst of the present invention. The sum of the zeolite components in combination must be 100 weight %. In zeolite component systems one zeolite (e.g. component (i)) may be present in an amount from 10 to 90, typically 15 to 80, preferably from 30 to 55 weight % of the total zeolite content and the other component (e.g. zeolite (ii)) may be present in an amount from 90 to 10, typically 85 to 20, preferably from 70 to 45 weight %. While the inventions encompass four component zeolites blends typically the catalyst comprises 2 or 3 zeolites. In two component systems zeolites components (ii), or (iii) or (iii) may be present in an amount from 90 to 30, typically 75 to 45 preferably from 70 to 45 weight %. In three and four component systems typically two zeolite components (e.g. (i) and (ii)) form a predominant amount of the zeolites while the other zeolite components (e.g. (iii) and (iv)) are used in amounts typically less than 20 weight % (e.g. 30 to 45 weight % of zeolite component (i), 30 to 45 weight % of zeolite component (ii) and from 10 to 40 weight % of one or more of zeolite components (iii) and (iv)).

The catalyst also comprises a matrix component typically selected from the group consisting of clays, synthetic matrix other than pillared clay, and mixtures thereof. The matrix should be a substance capable of calcining or firing to form a hard mass or particles. Kaolin is a readily available clay which can be fired to form a hard mass or particles although any clay including montmorillonites, smectites, and illites types of clay could be used. The matrix may be used in amounts form 15 to 55 typically 30 to 50 weight % of the final catalyst.

The catalyst also comprises a sol or a gel of a binder selected from the group consisting of oxides of aluminum, silicon and mixtures there of. The sol or gel may be used in amounts from 10 to 20 weight % of the catalyst.

The catalyst may also include from 0 to 15, typically less than 10, preferably less than 8 weight % of an oxide of a group IVB or VB metal. Some useful oxides include titanium dioxide, zirconium dioxide and vanadium dioxide, preferably titanium dioxide.

The catalyst is prepared by forming a slurry of the above components. For example the matrix and the binder may be combined and then the zeolite(s) are added and the resulting slurry/ mixture is mechanically mixed (e.g. using a stirrer) to form a uniform mixture. The slurry is then formed into particulates having a size from about 0.001 to 0.8 mm, preferably from 0.005 to 0.150 mm. The slurry may be formed into particulates in any manner. The slurry could be formed into particulates by spray drying the resulting slurry at a temperature from 100° C. to 650° C., followed by calcining the resulting solid at a temperature from 500° C. to 800° C. The slurry could be dried for example at a temperature from 100° C. to 200° C., typically less than 150° C. The resulting solid product could then be calcined at a temperature from 500° C. to 800° C. for a time from 1 to 20 hours and subject to a size seduction step-(comminution step (e.g. crushed, ground, milled, etc. into smaller particulates)). Then the product could, if necessary be treated with steam, water or both at a temperature from temperature from 110° C. to 800° C., a pressure from 103.3 kPa to $6.89 \times 10^3$ kPa for a time from 0.1 to 20 hours. Optionally the catalyst could be treated with 0 to 15 weight % of a phosphorus compound calculated as $P_2O_5$ based on the weight of the catalyst (prior to steam/water treatment). If necessary, the resulting dried catalyst could be ground or milled until it has the required particle size. In another embodiment the gel could be extruded as particles and subjected to the required treatment in the required order. The formation of catalyst particulates is well known to those skilled in the art.

The present invention provides the catalyst made in accordance with the above teachings.

The catalysts are suitable for cracking and in particular fluid catalytic cracking (FCC) of heavy feeds such as vacuum gas oil from the treatment of oil sands, shale oils and heavy crudes having a boiling point greater than 300° C., preferably greater than 350° C., preferably greater than 400° C. Some of the properties of suitable heavy feed stocks are set out in Tables 3 and 7 of the examples below. The catalysts of the present invention produce a higher amount of light olefins particularly ethylene, propylene and some butene together with a gasoline and diesel fraction while producing less coke make.

The process is typically conducted in a continuous manner in a reactor having at least one side riser to introduce a mixture of fresh and regenerated catalyst and a regenerator with a cyclone to decoke the catalyst and separate off gases.

Typically the cracking is conducted at a temperature from 500° C. to 800° C. and a pressure from 103.3 kPa to $6.89 \times 10^3$ kPa to produce more than 15% of $C_{2-4}$ olefins, and gasoline and diesel cuts as co-products, and having a coke make of less than 18%, preferably less than 12%.

The ratio of water (or steam or hydrogen) to oil may be from 0.45 to 0.60 typically 0.5 to 0.6 preferably about 0.55.

The catalyst of the present invention may be regenerated by heating it to "burn" the coke off, typically at temperatures from 500° C. to 800° C., preferably from 600 to 750° C.

The present invention will now be illustrated by the following non limiting examples.

Alkaline Treated ZSM 5 (AT-ZSM-5)

The sodium form of ZSM-5 zeolite was treated with 0.2 molar NaOH at 100° C. for about 30 minutes. The treatment extracted silica and reduced the ratio of $SiO/Al_2O_3$ to about 25 (compared to a ratio of about 40 in the untreated ZSM-5 (sodium form). The resulting alkaline treated ZSM-5 zeolite was ion exchanged into the proton form in a conventional manner.

For comparative purposes the starting sodium form of the ZSM-5 catalyst was converted to the proton form.

Figure 1:
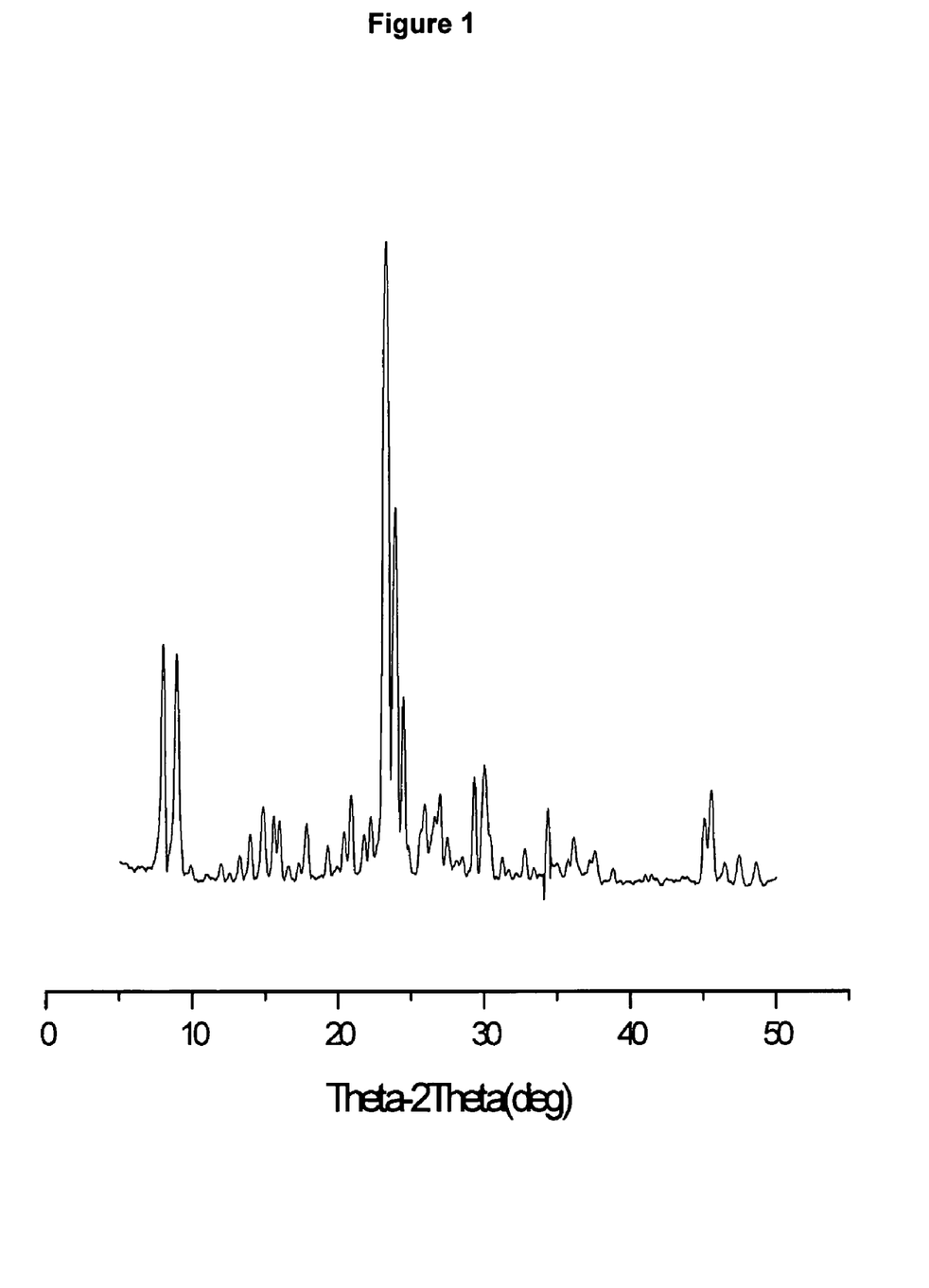
FIG. 1 is an x-ray diffraction pattern of an alkali treated shape selective zeolite (alkaline treated ZSM5-sodium form).

The alkaline treated ZSM-5 zeolite (sodium form) was analyzed by x-ray diffraction and the resulting pattern is shown in FIG. 1. The XRD pattern indicates that the basic micropore structure of the ZSM-5 zeolite is preserved in the course of alkaline treatment, i.e. the material's crystal phase is still ZSM-5 type zeolite, no other detectable zeolite (or crystal) phase formed.

Figure 2:
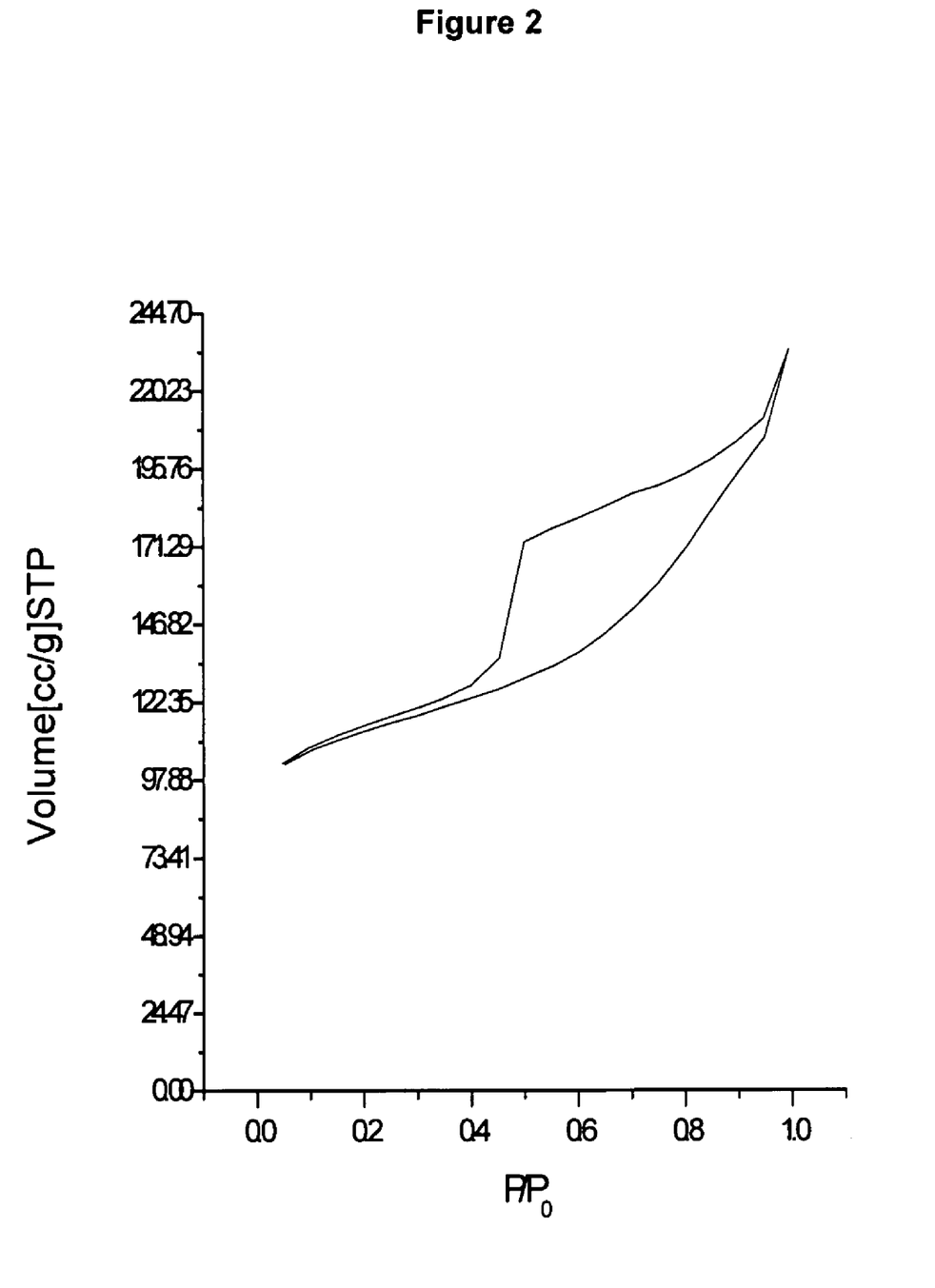
FIG. 2 shows nitrogen adsorption and desorption isotherms at 77 K for an alkaline treated shape selective zeolite (alkali treated ZSM-5, proton form).

The alkaline treated ZSM-5 zeolite in proton form was subjected to $N_2$ adsorption and desorption at 77° K. The $N_2$ adsorption-desorption isotherms is shown in FIG. 2. The figure shows a clear appearance of a characteristic hysteresis loop, which suggests that mesopore or large-pore structure(s) are formed in the alkaline treated ZSM-5 zeolite.

Figure 3:
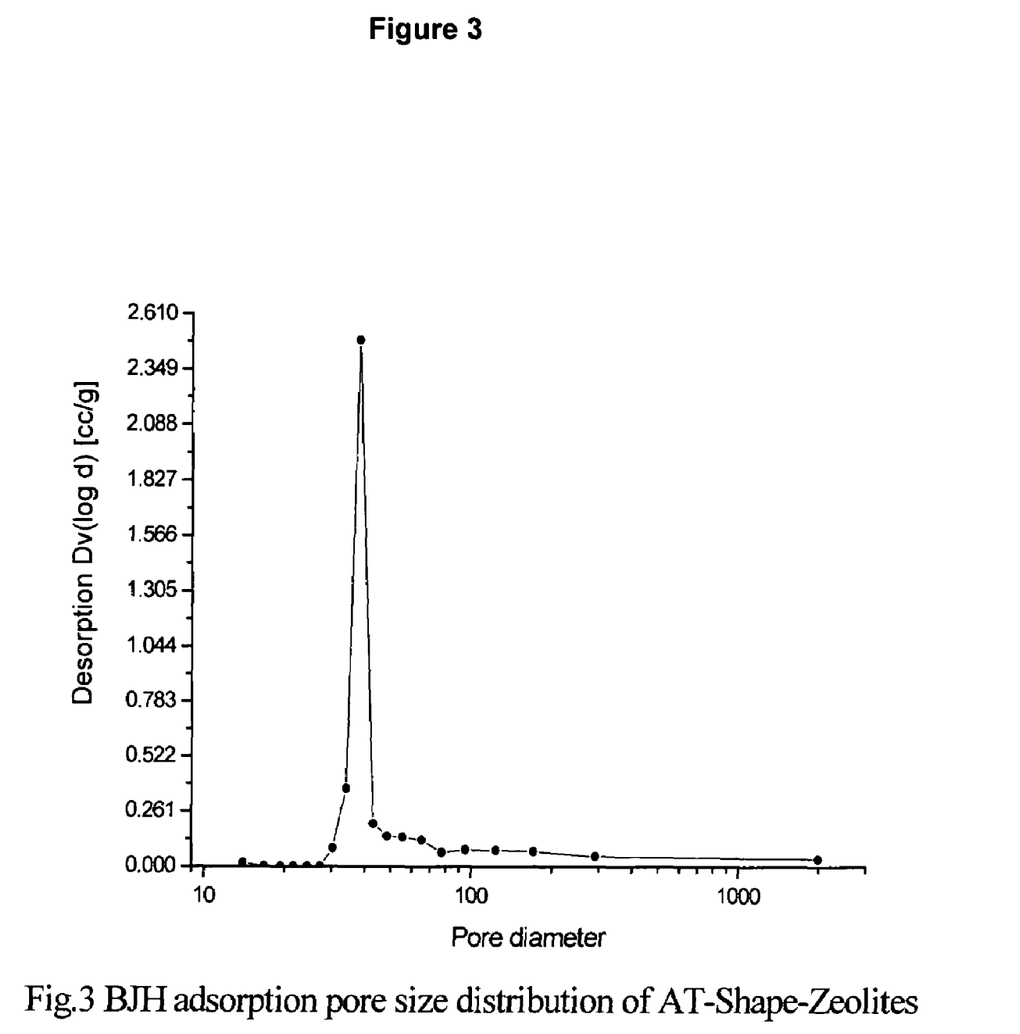
FIG. 3 is a BJH pore size distribution of an alkaline treated shape selective zeolite (alkaline treated ZSM-5 proton form).

The BJH pore size distribution curve of the alkaline treated ZSM-5 zeolite (proton form) obtained based on the same $N_2$ adsorption and desorption experiment, is shown in FIG. 3. From this pore size distribution curve, one can infer that the treatment formed meso- to large-pore structure(s) upon alkaline treatment, and gives us the pore size distribution information.

There is no obvious difference in the shape of XRD pattern, $N_2$ adsorption-desorption isotherms and pore size distribution curve between the sodium form of AT-ZSM-5 and proton form of AT-ZSM-5.

Table 1 shows a comparison of the properties of the starting sodium form of the ZSM-5 zeolite (NaZSM-5), the alkaline treated ZSM-5 zeolite (e.g. still sodium form, AT-NaZSM-5) and the protonated form of the alkaline treated ZSM-5 zeolite (AT-HZSM-5). The data in Table 1 indicate that the alkaline treatment increase the pore size/volume obviously, its meso-large pore BET surface area increased from 20.7 m$^2$/g to 136.2 m$^2$/g.

TABLE 1

Analysis Data Of One AT-Zeolite And Original Nazsm-5

| Sample | Relative Crystallinity | $S_{BET}$ m$^2$/g | $S_{Micropore}$ m$^2$/g | $S_{meso-large\ pore}$ m$^2$/g | $V_p$ cc/g | $V_{micro}$ cc/g | $V_{p-micro}$ cc/g | $D_{aver}$ Å |
|---|---|---|---|---|---|---|---|---|
| NaZSM-5 | 95% | 304.6 | 283.9 | 20.7 | 0.1821 | 0.1396 | 0.0425 | 23.92 |
| AT-NaZSM-5 | 94% | 371.5 | 235.3 | 136.2 | 0.3583 | 0.1259 | 0.2324 | 38.58 |
| AT-HZSM-5 | 95% | 372.9 | 236.6 | 136.3 | 0.3610 | 0.1257 | 0.2353 | 38.59 |

EXAMPLE 1

This example discloses the differences of product selectivity and yields between a catalyst made with alkali treated ZSM-5 (AT-ZSM-5, proton form) and the catalyst made using ZSM-5 which has not been alkaline treated but is in proton form (HZSM-5).

Catalyst 1

The catalyst uses HZSM-5 zeolite, AT-ZSM-5 zeolite and Beta zeolite as active components, clay as matrix, and aluminium sol as binder. A total of 8% (mass) of $P_2O_5$ is loaded on active components (zeolites) by ordinary incipient wetness impregnation technique. After loading the phosphorus the active components were dried at 120° C. for 2 hours and then calcined at 600° C. for 4 hours.

The catalyst components and preparation method are as follows: 38% (mass) of kaoline is added to 17% (mass) of alumina binder, stirring for 30 min, then the 45% (mass) of phosphorus loaded active components (it includes 33% (mass) of phosphorus modified HZSM-5 (SiO$_2$/Al$_2$I$_3$=40) zeolite, 45% (mass) of phosphorus modified AT-ZSM-5 zeolite (SiO$_2$/Al$_2$O$_3$=21, obtained from NaZSM-5 (SiO$_2$/Al$_2$O$_3$=40) by alkali treatment with 0.2M NaOH water solution, and then ion exchanged to H form by ordinary procedure), 22% of phosphorus modified beta zeolite (SiO$_2$/Al$_2$O$_3$=25)) are added to the solution, and the solution is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then aged with 100% steam at 750° C. for 6 hours.

Catalyst 2 (Without AT-ZSM-5-Comparison)

The catalyst just uses HZSM-5 zeolite and beta zeolite as active components (no AT-ZSM-5 is used), clay as matrix, and aluminium sol as binder. A total of 8% (mass) of $P_2O_5$ is loaded on active components by ordinary incipient wetness impregnation technique.

The catalyst components and preparation method are as follows: 38% (mass) of kaoline is added to 17% (mass) of alumina binder, stirring for 30 min, then the 45% (mass) of phosphorus modified active components (it includes 78% (mass) of phosphorus modified HZSM-5 (SiO$_2$/Al$_2$O$_3$=40) zeolite, 22% of phosphorus modified beta zeolite (SiO$_2$/Al$_2$O$_3$=25)) are added to the solution, and the solution is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then it is aged with 100% of steam at 750° C. for 6 hours.

Catalytic pyrolysis testing of feedstock is performed in a standard fluidized bed reactor system. The reactions are carried out at 660° C., the ratio of catalyst to oil is 15.50 (m/m), and the ratio of water to oil is 0.55 (m/m) (all the examples listed below use the same reaction condition). The performance of the catalysts is reported in Table 2.

The properties of feedstock (HVGO) in this example are shown in Table 3.

TABLE 2

| Yields, % (m) | Catalyst 1 | Catalyst 2 |
|---|---|---|
| Ethylene + Propylene | 26.39 | 24.76 |
| Total Olefin | 34.60 | 31.07 |
| Coke | 6.04 | 9.13 |

TABLE 3

Feedstock (HVGO) Assay Summary

| | |
|---|---|
| Density, g/cm$^3$, at 20° C. | 0.96 |
| Viscosity, Pa · s, at 50° C. | 0.0674 |
| Elements: | |
| C, (wt. %) | 85.22 |
| H, (wt. %) | 11.24 |
| Distillation: | |
| IBP, (° C.) | 171 |
| FBP, (° C.) | 576 |

The results show that the catalyst containing AT-ZSM-5 zeolite has higher ethylene and propylene yields, higher yields of total olefins and lower yield of coke than those of the catalyst using normal HZSM-5 zeolite as active component in the catalytic cracking reaction.

EXAMPLE 2

This example discloses the differences of product selectivity and yields of the catalysts by using different phosphorus treating methods.

Catalyst 3 (Phosphorus Modification by In-Situ Hydrothermal Treatment Technique)

The catalyst uses HZSM-5 zeolite and Y-faujaste type zeolite as active components, clay as matrix, and aluminium sol as binder. A total of 8% (mass) of $P_2O_5$ is loaded by directly spraying diammonium phosphate (($NH_4$)$_2$$HPO_4$) water solution onto the hot active component at 680° C. in a rotary tube in 3 hours.

The catalyst components and preparation method are as follows: 48% (mass) of kaoline is added to 17% (mass) of alumina binder (sol), stirring for 30 min, then the 35% (mass) of active components treated by phosphorus hydrothermal treatment (it includes 55% (mass) of phosphorus modified HZSM-5 ($SiO_2$/$Al_2O_3$=40) zeolite, 45% of phosphorus modified USY zeolite ($SiO_2$/$Al_2O_3$=11)) are added to the solution, and the solution is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then it is aged with 100% steam at 750° C. for 6 hours. The performance of the catalysts is reported in Table 4 (feeds are same with example 1).

Catalyst 4 (Phosphorus Modification by Multi-Steps Impregnation and Steaming Technique)

The catalyst uses HZSM-5 zeolite and Y-faujasite type zeolite as active components, clay as matrix, and aluminium sol as binder. A total of 8% (mass) of $P_2O_5$ is loaded through a multi-steps incipient wetness impregnation plus steaming technique, i.e. phosphorus solution (diammonium phosphate (($NH_4$)$_2$$HPO_4$) water solution) was loaded to the zeolite by known incipient wetness impregnation process, and then it is steamed with 100% steam for 1 hour at 560° C. A total of 8% (mass) of $P_2O_5$ is loaded by repeating the above process up to 5 times.

The catalyst components and preparation method are as follows: 48% (mass) of Kaoline is added to 17% (mass) of alumina binder, stirring for 30 min, then the 35% (mass) of active components treated by multi-steps impregnation and steaming technique (it includes 55% (mass) of phosphorus modified HZSM-5 ($SiO_2$/$Al_2O_3$=40) zeolite, 45% (mass) of phosphorus modified USY zeolite ($SiO_2$/$Al_2O_3$=11)) are added to the solution, and the solution is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then it is aged with 100% steam at 750° C. for 6 hours.

The performances of the catalysts are reported in Table 4 (feeds/conditions are the same as example 1).

Catalyst 5 (Phosphorus Modification by Ordinary Incipient Wetness Impregnation Technique)

The catalyst uses HZSM-5 zeolite and Y-faujaste type zeolite as active components, clay as matrix, and aluminium sol as binder. A total of 8% (mass) of $P_2O_5$ is loaded on active components by ordinary incipient wetness impregnation technique as described above.

The catalyst components and preparation method are as follows: 48% (mass) of kaoline is added to 17% (mass) of alumina binder, stirring for 30 min, then the 35% (mass) of active components treated by ordinary phosphorus incipient wetness impregnation technique (it includes 55% (mass) of phosphorus modified HZSM-5 ($SiO_2$/$Al_2O_3$=40) zeolite, 45% (mass) of phosphorus modified USY zeolite ($SiO_2$/$Al_2O_3$=11)) are added to the solution, and the solution is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then it is aged with 100% of steam at 750° C. for 6 hours. The performance of the catalysts are reported in Table 4 (feeds/conditions are the same as example 1).

TABLE 4

| Yields, % (m) | Catalyst 3 | Catalyst 4 | Catalyst 5 |
|---|---|---|---|
| Ethylene + Propylene | 26.08 | 25.20 | 23.04 |
| Butene | 8.72 | 8.34 | 5.94 |
| Total Olefin | 34.80 | 33.54 | 28.97 |

These results show that the catalyst with phosphorus by in-situ hydrothermal treatment or by multi-steps impregnation and steaming technique is more efficient to improve the yields of light olefin compared with that using ordinary phosphorus incipient wetness impregnation technique.

EXAMPLE 3

This example discloses the differences of product selectivity and yields of the catalysts with $TiO_2$ additive and the catalyst without $TiO_2$ additive.

Catalyst 6 (with $TiO_2$)

The catalyst uses HZSM-5 zeolite and Y-faujasite type zeolite as active components, clay as matrix, aluminum sol as binder, and $TiO_2$ as an additive. A total of 8% (mass) of $P_2O_5$ is loaded on the active component (i.e. zeolite(s)) by ordinary incipient wetness impregnation technique.

The catalyst components and preparation method are as follows:

50% (mass) of kaoline and 10% of $TiO_2$ (anatase) are added to 12% (mass) of alumina binder, stirring for 30 min, then the 28% (mass) of phosphorus modified active components (it includes 55% (mass) of phosphorus modified HZSM-5 ($SiO_2$/$Al_2O_3$=40) zeolite, 45% (mass) of phosphorus modified USY zeolite ($SiO_2$/$Al_2O_3$=11)) are added to the mixture, and the resulting mixture is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then it is aged with 100% steam at 750° C. for 6 hours. The performance of the catalyst is reported in Table 5 (feeds/conditions are same as example 1).

Catalyst 7 (Without $TiO_2$)

The catalyst uses HZSM-5 zeolite and Y-faujasite type zeolite as active components, clay as matrix, and aluminum sol as binder, without the $TiO_2$ additive. A total of 8% (mass) of $P_2O_5$ is loaded on active component by ordinary incipient wetness impregnation technique.

The catalyst components and preparation method are as follows: 60% (mass) of kaoline is added to 12% (mass) of alumina binder, stirring for 30 min, then 28% (mass) of phosphorus modified active components (it includes 55% (mass) of phosphorus modified HZSM-5 ($SiO_2$/$Al_2O_3$=40) zeolite, 45% (mass) of phosphorus modified USY zeolite ($SiO_2$/$Al_2O_3$=11)) are added to the solution, and the solution is mechanically mixed to form a homogeneous slurry. The slurry is dried at 120° C. for 2 hours and then calcined at 600° C. for 4 hours. The obtained solid is crushed to 40-60 mesh (0.2 to 0.8 mm) and then it is aged with 100% steam at 750° C. for 6 hours.

The performance of the catalysts are reported in Table 5 (feeds/conditions are the same as example 1).

TABLE 5

| Yields, (wt. %) | Catalyst 6 | Catalyst 7 |
|---|---|---|
| Ethylene | 7.92 | 6.80 |
| Propylene | 12.60 | 11.92 |
| Ethylene + Propylene | 20.52 | 18.71 |
| Butene | 6.01 | 5.74 |
| Total Olefin | 26.53 | 24.45 |

These results show that the catalyst with metal oxide additive is more efficient to improve the yields of light olefins than the catalyst without metal oxide additive.

EXAMPLE 4

This example discloses the differences of product selectivity and yields of the catalysts post-modified with phosphorus and the catalyst without post-modification.

Catalyst 8 (With Post-Phosphorus Modifying)

The catalyst uses HZSM-5 zeolite and Y-faujasite type zeolite as active components, clay as matrix, and aluminum sol as binder. A total of 7% (mass) of $P_2O_5$ is loaded on active component by ordinary incipient wetness impregnation technique. In the last step, the catalyst is post-modified by phosphorus. An additional 3% (mass) of $P_2O_5$ is loaded on catalyst by ordinary incipient wetness impregnation technique.

The catalyst components and preparation method are as follows: 54% (mass) of kaoline is added to 17% (mass) of alumina binder, stirring for 30 min, then the 26% (mass) of phosphorous modified active components (it includes 55% (mass) of phosphorous modified HZSM-5 ($SiO_2/Al_2O_3$=40) zeolite, 45% (mass) of phosphorous modified USY zeolite ($SiO_2/Al_2O_3$=11)) are added to the solution, and the resulting slurry is mechanically mixed to form a homogeneous slurry. The slurry is dried at 120° C. for 2 hours and then calcined at 600° C. for 4 hours. The obtained solid is crushed to 40-60 mesh (0.2 to 0.8 mm). The catalyst is then post-modified with 3% (mass, calculate based on $P_2O_5$) phosphorus by ordinary incipient wetness impregnation technique and dried at 100° C. for 2 hours. Then the catalyst is aged with 100% steam at 750° C. for 6 hours. The performance of the catalyst is reported in Table 6, the feedstock (HAGO) used has characteristics as shown in Table 7.

Catalyst 9 (Without Post-Phosphorus Modification)

The catalyst uses HZSM-5 zeolite and Y-faujasite type zeolite as active components, clay as matrix, and aluminum sol as binder. A total of 10% (mass) of $P_2O_5$ is loaded on active components by ordinary incipient wetness impregnation technique.

The catalyst components and preparation methods are as follows: 54% (mass) of kaoline is added to 17% (mass) of alumina binder, stirring for 30 min, then the 29% (mass) of phosphorous modified active components (it includes 55% (mass) of phosphorous modified HZSM-5 ($SiO_2/Al_2O_3$=40) zeolite, 45% (mass) of phosphorous modified USY zeolite ($SiO_2/Al_2O_3$=11)) are added to the mixture, and the mixture is mechanically mixed to form a homogeneous slurry. The slurry is dried at 120° C. for 2 hours and then calcined at 600° C. for 4 hours. The obtained solid is crushed to 40-60 (0.2 to 0.8 mm). The catalyst is then contacted with distilled water by ordinary incipient wetness impregnation technique and dried at 100° C. for 2 hours. Then the catalyst is aged with 100% steam at 750° C. for 6 hours. The performance of the catalyst is reported in Table 6, the feedstock (HAGO) used is as shown in Table 7.

TABLE 6

| Yields, % (m) | Catalyst 8 | Catalyst 9 |
|---|---|---|
| Ethylene | 9.58 | 8.80 |
| Propylene | 18.04 | 16.46 |
| Ethylene + Propylene | 28.62 | 25.26 |
| Butene | 9.14 | 7.68 |
| Total Olefin | 36.76 | 32.94 |

TABLE 7

| HAGO Feedstock Assay Summary | |
|---|---|
| Density, g/cm³, at 20° C. | 0.86 |
| Viscosity, pa · s, at 50° C. | 0.0042 |
| Elements: | |
| C, (wt. %) | 86.07 |
| H, (wt. %) | 13.07 |
| Distillation: | |
| IBP, (° C.) | 175.4 |
| FBP, (° C.) | 421.8 |

These results show that the catalyst, which underwent post-modification with phosphorus had improved yields of light olefins compared to the catalyst without phosphorus post-modification.

EXAMPLE 5

This example discloses the differences of product selectivity and yields of the catalysts using ZSM-5 with higher silica to alumina ratio and those with lower silica to alumina ratio.

Catalyst 10 (Uses ZSM-5 With a Lower Silica to Alumina Ratio in its Framework)

The catalyst uses HZSM-5 zeolite (i.e. protonated form of the zeolite) having a lower silica to alumina ratio and Y-faujasite type zeolite as active components, clay as matrix, and aluminum sol as binder. A total of 8% (mass) of $P_2O_5$ is loaded on active components by ordinary incipient wetness impregnation technique.

The catalyst components and preparation method are as follows: 38% (mass) of kaoline is added to 17% (mass) of alumina binder, stirred for 30 min, then the 45% (mass) of phosphorus modified active components (it includes 55% (mass) of phosphorus modified HZSM-5 ($SiO_2/Al_2O_3$=50) zeolite, 45% (mass) of phosphorus modified USY zeolite ($SiO_2/Al_2O_3$=11)) are added to the mixture, and the mixture is mechanically mixed to form a homogeneous slurry. The slurry is dried at 120° C. for 2 hours and then calcined at 600° C. for 4 hours. The obtained solid is crushed to 40-60 mesh (0.2 to 0.8 mm). Then the catalyst is aged with 100% steam at 750° C. for 8 hours. The performance of the catalysts is listed in Table 8 (the same HAGO feedstock as shown in Table 7 was used).

Catalyst 11 (Uses ZSM-5 With a Higher Silica to Alumina Ratio in its Framework)

The catalyst uses HZSM-5 zeolite with higher silica to alumina ratio and Y-faujasite type zeolite as active components, clay as matrix, and aluminum sol as binder. A total of 8% (mass) of $P_2O_5$ is loaded on active component by ordinary incipient wetness impregnation technique.

The catalyst components and preparation method are as follows: 38% (mass) of kaoline is added to 17% (mass) of alumina binder, stirred for 30 min, then the 45% (mass) of phosphorus modified active components (it includes 55% (mass) of phosphorus modified HZSM-5 ($SiO_2/Al_2O_3$=360) zeolite, 45% (mass) of phosphorus modified USY zeolite ($SiO_2/Al_2O_3$=11)) are added to the mixture, and they are mechanically mixed to form a homogeneous slurry. The slurry is dried at 120° C. for 2 hours and then calcined at 600° C. for 4 hours. The obtained solid is crushed to 40-60 mesh (0.2 to 0.8 mm). Then the catalyst is aged with 100% steam at 750° C. for 8 hours. The performance of the catalysts is listed in Table 8 (the same HAGO feedstock as shown in Table 7 was used).

TABLE 8

| Yields, % (m) | Catalyst 10 | Catalyst 11 |
|---|---|---|
| Ethylene | 9.95 | 9.88 |
| Propylene | 22.16 | 20.63 |
| Ethylene + Propylene | 32.11 | 30.51 |
| Butene | 10.65 | 9.80 |
| Total Olefin | 42.76 | 40.31 |

These results indicate that the catalyst with ZSM-5 having a lower silica to alumina ratio is more effective in producing light olefins than the catalyst with ZSM-5 having a higher silica to alumina ratio.

EXAMPLE 6

This example discloses the differences in product selectivity and yields of catalysts with metal element modification and without any metal element modification.

Catalyst 12 (With Mn Element Modification)

The catalyst uses HZSM-5 zeolite and Y-faujasite type zeolite as active components, clay as matrix, and aluminum sol as binder. A total of 6 weight % of $P_2O_5$ and 3 weight % of $MnO_2$ are loaded on active components by ordinary incipient wetness impregnation technique.

The catalyst components and preparation method are as follows: 43% (mass) of kaoline is added to 17% (mass) of alumina binder, stirring for 30 min, then 40% (mass) of phosphorus and metal modified active components (it includes 50% (mass) of phosphorus and metal modified HZSM-5 ($SiO_2/Al_2O_3$=40) zeolite, 50% (mass) of phosphorus and metal modified USY zeolite ($SiO_2/Al_2O_3$=11)) are added to the mixture, and the mixture is mechanically mixed to form a homogeneous slurry. The slurry is dried at 120° C. for 2 hours and then calcined at 600° C. for 4 hours. The obtained solid is crushed to 40-60 mesh (0.2 to 0.8 mm). Then the catalyst is aged with 100% steam at 750° C. for 4 hours. The performance of the catalyst is listed in Table 9 (the same HAGO feed as shown in Table 7 was used).

Catalyst 13 (With Cr Element Modification)

The catalyst uses HZSM-5 zeolite and Y-faujasite type zeolite as active components, clay as matrix, and aluminum sol as binder. A total of 6% (mass) of $P_2O_5$ and 2% (mass) of $CrO_3$ are loaded on the active components by ordinary incipient wetness impregnation technique.

The catalyst components and preparation method are as follows: 43% (mass) of kaoline is added to 17% (mass) of alumina binder, stirred for 30 min, then 40% (mass) of phosphorus and metal modified active components (it includes 50% (mass) of phosphorus and metal modified HZSM-5 ($SiO_2/Al_2O_3$=40) zeolite, 50% (mass) of phosphorus and metal modified USY zeolite ($SiO_2/Al_2O_3$=11)) are added to the mixture and the mixture is mechanically mixed to form a homogeneous slurry. The slurry is dried at 120° C. for 2 hours and then calcined at 600° C. for 4 hours. The obtained solid is crushed to 40-60 mesh (0.2 to 0.8 mm). Then the catalyst is aged with 100% steam at 750° C. for 4 hours. The performance of the catalyst is listed in Table 9 (the same HAGO feed as shown in Table 7 was used).

Catalyst 14 (Without Metal Element Modification)

The catalyst uses HZSM-5 zeolite and Y-faujasite type zeolite as active components, clay as matrix, and aluminum sol as binder. A total of 6% (mass) of $P_2O_5$ is loaded on active components by ordinary incipient wetness impregnation technique.

The catalyst components and preparation method are as follows: 43% (mass) of kaoline is added to 17% (mass) of alumina binder, stirred for 30 min, then 40% (mass) of phosphorus modified active components (it includes 50% (mass) of phosphorus modified HZSM-5 ($SiO_2/Al_2O_3$=40) zeolite, 50% (mass) of phosphorus modified USY zeolite ($SiO_2/Al_2O_3$=11)) are added to the mixture, and the mixture is mechanically mixed to form a homogeneous slurry. The slurry is dried at 120° C. for 2 hours and then calcined at 600° C. for 4 hours. The obtained solid is crushed to 40-60 mesh (0.2 to 0.8 mm). Then the catalyst is aged with 100% steam at 750° C. for 4 hours. The performance of the catalyst is listed in Table 9 (the same HAGO feedstock as shown in Table 7 was used).

TABLE 9

| Yields, % (m) | Catalyst 12 | Catalyst 13 | Catalyst 14 |
|---|---|---|---|
| Ethylene | 10.92 | 10.53 | 8.92 |
| Propylene | 22.50 | 22.37 | 21.93 |
| Ethylene + Propylene | 33.42 | 32.90 | 30.85 |
| Butene | 10.66 | 10.59 | 9.78 |
| Total Olefin | 44.08 | 43.49 | 40.63 |

EXAMPLE 7

This example discloses the differences of product selectivity and yields of a catalyst prepared with AT-ZSM-5, in-situ phosphorus steam modification and employing metal oxide additives and a catalyst prepared using ordinary ZSM-5, ordinary phosphorus modification procedure and without metal oxide additives.

Catalyst 15 (Uses AT-ZSM-5, In-Situ Phosphorus Steaming Modification and Employs Metal Oxide Additives)

The catalyst uses HZSM-5 zeolite, AT-ZSM-5, beta zeolite and type zeolite as active components, clay as matrix, and aluminum sol as binder. A total of 5% (mass) of $P_2O_5$ is loaded by directly spraying the diammonium phosphate ($NH_4)_2HPO_4$) water solution onto the hot active component at 580° C. in a rotary tube over 3 hours.

The catalyst components and preparation method are as follows: 37% (mass) of kaoline and 6% of $TiO_2$ (anatase) are added to 17% (mass) of alumina binder, stirring for 30 min, then the 40% (mass) of phosphorus modified active components (it includes 35% (mass) of phosphorus modified HZSM-5 ($SiO_2/Al_2O_3$=38) zeolite, 35% (mass) of phosphorus modified AT-ZSM-5 zeolite (same with that in Catalyst 1), 30% (mass) of phosphorus modified beta zeolite ($SiO_2/Al_2O_3$=25)) are added to the mixture, and the mixture is mechanically mixed to form a homogeneous slurry. The slurry is spray dried at an inlet temperature of 500° C. and then the obtained particulates calcined at 600° C. for 4 hours. The obtained catalyst particulates had a size from 0.010 to 0.130 mm. Then the catalyst is aged with 100% steam at 750° C. for 6 hours. The performance of the catalyst is listed in Table 10 (the same HVGO feedstock as shown in Table 3 was used).

Catalyst 16 (Uses Ordinary ZSM-5, Ordinary Phosphorus Modification Procedure and Without Metal Oxide Additives)

The catalyst uses HZSM-5 zeolite and beta zeolite as active components, clay as matrix, and aluminum sol as binder. A total of 5% (mass) of $P_2O_5$ is loaded on active components by ordinary incipient wetness impregnation technique.

The catalyst components and preparation method are as follows: 43% (mass) of kaoline and 17% (mass) of alumina binder, stirring for 30 min, then the 40% (mass) of phosphorus modified active components (it includes 70% (mass) of phosphorus modified HZSM-5 ($SiO_2/Al_2O_3$=38) zeolite, 30% (mass) of phosphorus modified beta zeolite ($SiO_2/Al_2O_3$=25)) are added to the mixture, and the mixture is mechanically mixed to form a homogeneous slurry. The slurry is spray dried at an inlet temperature of 500° C. and then the obtained particulates calcined at 600° C. for 4 hours. The obtained catalyst particulates have a size from 0.010 to 0.130 mm. Then the catalyst is aged with 100% steam at 750° C. for 6 hours. The performance of the catalyst is listed in Table 10 (the same HVGO feedstock as shown in Table 3 was used).

TABLE 10

| Yields, % (m) | Catalyst 15 | Catalyst 16 |
| --- | --- | --- |
| Ethylene | 10.88 | 9.16 |
| Propylene | 18.97 | 17.86 |
| Ethylene + Propylene | 29.85 | 27.02 |
| Butene | 10.71 | 10.13 |
| Total Olefin | 40.56 | 37.15 |
| Gasoline | 19.52 | 17.08 |
| LCO | 14.41 | 13.89 |
| Slurry (heavy oil) | 3.25 | 5.20 |
| Coke | 8.75 | 10.42 |
| Conversion | 96.75 | 94.80 |

These results shown in Table 10 indicate that the catalyst using AT-ZSM-5, in-situ phosphorus steaming modification and metal oxide additives shows better light olefin selectivity and more useful products (such as gasoline and LCO) and lower yield of slurry and coke compared with the corresponding catalyst using the ordinary material and modification procedure. The conversions are defined as 100% minus the percentage of obtained slurry (heavy oil).

What is claimed is:

1. A process for preparing a modified zeolite catalyst comprising forming a slurry of from 15 to 55 weight % of a matrix component selected from the group consisting of clays, synthetic matrix other than pillared clay, and mixtures thereof and from 10 to 20 weight % of a sol or gel of a binder selected from the group consisting of oxides of aluminum, silicon, and mixtures thereof and from 0 to 15 weight % of an oxide of a group IVB or VB metal adding thereto from 10 to 75 weight % of a mixture of one or more zeolites selected from the group consisting of:
   (i) not less than 10 weight %, based on the total weight of zeolites, of a zeolite having a silica to alumina ratio from 25 to 200 and up to 12 rings in a structural unit which has been treated with less than 0.5 molar alkaline solution at a temperature from 20° C. to 350° C. to reduce the silica to alumina ratio to less than 45, said alkaline treated zeolite having a meso-large pore BET surface area of greater than 50 $m^2/g$;
   (ii) a zeolite having a silica alumina ratio from 10 to 70 and up to 12 rings in a structural unit and a meso large pore size BET surface area less than 40 $m^2/g$;
   (iii) a beta zeolite having a structure in which the silica to aluminum ratio is less than 100;
   (iv) a Y-faujasite type zeolite having a structure in which silica to alumina ratio is less than 30;
the sum of components (i), (ii), (iii) and (iv) adding up to 100 weight % of the zeolite components in said catalysts,
wherein one or more of said zeolite components have been subjected to one or more of the following treatments
   (a) impregnating said zeolite with a phosphorus compound to provide from 0.2 to 15 weight % calculated as $P_2O_5$ based on the weight of the zeolite and either currently or subsequently treating the impregnated zeolite with steam or water at a temperature from 110° C. to 800° C. at a pressure from 103.3 kPa to $6.89 \times 10^3$ kPa for a time from 0.1 to 20 hours;
   (b) treating said zeolite with one or more group IVB, VB, VIB and VIII metal compounds to provide from 0.1 to 10 weight % of the metal based on the weight of the zeolite;
   (c) treating said zeolite with one or more rare earth compounds to provide from 0.1 to 10 weight % of the oxide of the rare earth metal based on the weight of the zeolite;
forming particulates of said catalyst having a size from 0.001 to 0.8 mm.

2. The process according to claim 1, wherein zeolite component (i) has a silica to alumina ratio less than 40.

3. The process according to claim 2, wherein zeolite component (i) is present in an amount from 10 to 90 weight % of the total zeolite content.

4. The process according to claim 3, wherein the phosphorus content in the catalyst is from 0.2 to 15 weight % based on the total weight of the catalyst.

5. The process according to claim 4, wherein said zeolite, said catalyst or both are treated with a phosphorus compound selected from the group consisting of ammonium dihydrogen phosphate and diammonium hydrogen phosphate, ammonium hypophosphate, ammonium orthophosphate, ammonium dihydrogen orthophosphate, ammonium hydrogen orthophosphate, triammonium phosphate, phosphine halides and organic phosphates, phosphines, and phosphates, and combinations thereof.

6. The process according to claim 5, wherein zeolite component (i) is selected from the group consisting of ZSM-5, ZSM-8, ZSM-11, ZSM-12, ZSM-35, ZSM-38 and mixtures thereof.

7. The process according to claim 6, wherein the group VB, VIB, VIIB and VIII elements are selected from the group consisting of V, Cr, Mn, Co, Ni, Cu, and mixtures thereof.

8. The process according to claim 7, wherein zeolite component (i) has a meso-large pore BET surface area greater than 80 $m^2/g$.

9. The process according to claim 8, wherein zeolite component (ii) is selected from the group consisting of ZSM-5, ZSM-8, ZSM-11, ZSM-12, ZSM-35, ZSM-38 and mixtures thereof.

10. The process according to claim 1, wherein zeolite components (ii), (iii) and (iv) or a mixture there of are present in a total amount from 10 to 90 weight % of the zeolite components.

11. The process according to claim 1, wherein said catalyst is formed into particles by one or more processes selected from the group consisting of:

(i) spray drying the resulting slurry at a temperature from 100° C. to 650° C., followed by calcining the resulting solid at a temperature from 500° C. to 800° C.;

(ii) drying the resulting slurry at a temperature from 100° C. to 150° C.; calcining the resulting solid at a temperature from 500° C. to 800° C. and subjecting it to a comminution step; and (iii) by extruding the resulting slurry and drying the resulting extrudate.

12. The process according to claim 1, wherein the final particle size for the catalyst is from 0.005 to 0.150 mm.

13. The process according to claim 1, wherein the resulting catalyst is further treated with from 0 to 15 weight % of a phosphorus compound calculated as $P_2O_5$ based on the weight of the catalyst.

14. A catalyst suitable for cracking a hydrocarbon feedstock having a boiling point above 300° C. at a temperature from 500° C. to 800° C. and a pressure from 103.3 kPa to $6.89 \times 10^3$ kPa to produce more than 15% of $C_{2-4}$ olefins, and gasoline and diesel cuts as co-products, having a coke make of less than 18% prepared according to claim 1.

* * * * *

UNITED STATES PATENT AND TRADEMARK OFFICE
CERTIFICATE OF CORRECTION

PATENT NO. : 7,459,413 B2  Page 1 of 2
APPLICATION NO. : 11/709115
DATED : December 2, 2008
INVENTOR(S) : Baojian Shen et al.

It is certified that error appears in the above-identified patent and that said Letters Patent is hereby corrected as shown below:

The paragraph in col. 3, at lines 28-31 reads:

"(b) treating said zeolite with one or more group IVB, VB, VIB and VIII metal compounds to provide from 0.1 to 10 weight % of the metal based on the weight of the zeolite;"

but should read:

-- (b) treating said zeolite with one or more group VB, VIB, VIIB, VIII and Cu metal compounds to provide from 0.1 to 10 weight % of the metal based on the weight of the zeolite; --

The paragraph in col. 5, at lines 37-39 reads:

"(b) treating said zeolite with one or more group IVB, VB, VIB and VIII metal compounds to provide from 0.1 to 10 weight % of the metal based on the weight of the zeolite;"

but should read:

-- (b) treating said zeolite with one or more group VB, VIB, VIIB, VIII and Cu metal compounds to provide from 0.1 to 10 weight % of the metal based on the weight of the zeolite; --

The paragraph in col. 6, at lines 49-61 reads:

"The zeolite may be treated (impregnated or ion exchanged) with one metal element selected from the group consisting of Group VB, VIB, VIIB and VIII elements of the periodic table to form a metal treated, or exchanged zeolite. The metal element may be selected from the group consisting of the nitrate, sulfate, sulfide, chloride, bromide, fluoride, acetate, carbonate, perchlorate, phosphate of V, Cr, Mn, Fe, Co, Ni and Cu and combinations thereof. The amount of metal, in the form of metal oxide, is to provide a concentration in said zeolites in the range of from about 0.1 to about 15, preferably less than 12, typically less than 10 weight percent of the weight of the zeolite. This corresponds to about 0.1 to 8 weight % based on the total weight of the catalyst."

Signed and Sealed this

Thirtieth Day of November, 2010

David J. Kappos
*Director of the United States Patent and Trademark Office*

CERTIFICATE OF CORRECTION (continued)
U.S. Pat. No. 7,459,413 B2 but should read:

-- The zeolite may be treated (impregnated or ion exchanged) with one metal element selected from the group consisting of VB, VIB, VIIB, VIII and Cu elements of the periodic table to form a metal treated, or exchanged zeolite. The metal element may be selected from the group consisting of the nitrate, sulfate, sulfide, chloride, bromide, fluoride, acetate, carbonate, perchlorate, phosphate of V, Cr, Mn, Fe, Co, Ni and Cu and combinations thereof. The amount of metal, in the form of metal oxide, is to provide a concentration in said zeolites in the range of from about 0.1 to about 15, preferably less than 12, typically less than 10 weight percent of the weight of the zeolite. This corresponds to about 0.1 to 8 weight % based on the total weight of the catalyst. --

In claim 1 the paragraph in col. 18, at lines 22-24, reads:

"(b) treating said zeolite with one or more group IVB, VB, VIB and VIII metal compounds to provide from 0.1 to 10 weight % of the metal based on the weight of the zeolite;"

but should read:

-- (b) treating said zeolite with one or more group VB, VIB, VIIB, VIII and Cu metal compounds to provide from 0.1 to 10 weight % of the metal based on the weight of the zeolite; --

Claim 7 reads:

"7. The process according to claim 6, wherein the group VB, VIB, VIIB and VIII elements are selected from the group consisting of V, Cr, Mn, Co, Ni, Cu, and mixtures thereof."

but should read:

-- 7. The process according to claim 6, wherein the group VB, VIB, VIIB, VIII and Cu elements are selected from the group consisting of V, Cr, Mn, Co, Ni, Cu, and mixtures thereof. --